3,150,173
SEPARATION OF PHTHALIC ISOMERS
Peter Fotis, Highland, Ind., and Ellis K. Fields, Chicago, Ill., assignors to Standard Oil Company, Chicago, Ill., a corporation of Indiana
No Drawing. Filed Dec. 3, 1959, Ser. No. 856,940
3 Claims. (Cl. 260—525)

The present invention relates to a method of separating mixtures of phthalic acid isomers, and further relates to the separation of mixtures of isophthalic acid and terephthalic acid by treating the mixture of acids with a lithium halide and an oxygented organic solvent. More particularly, the invention concerns a process for separating solid mixtures of isophthalic acid and terephthalic acid by contacting or treating the mixture of acids with lithium bromide and an oxygenated organic solvent and separating resulting liquid and solid phases.

A common preparation of phthalic acids is by oxidizing the corresponding xylenes. For example, mixed petroleum xylenes containing meta- and para-xylenes may be oxidized to form a mixture of isophthalic and terephthalic acids. The phthalic acids are useful as reactants to form polyester polymers. Where polyesters are formed from a mixture of phthalic acid isomers, the melting point of the polyester product is substantially lower than it would be if the polyester were prepared from a substantially pure phthalic acid isomer. Further, the substantially pure isomers polymerize or polyesterify more rapidly to form polyesters. Because of the desirable higher melting point of the polyester formed and because of the increased rate of polymerization or polyesterification it is desirable to separate the phthalic acid isomers for use in the polymerization or polyesterification reaction. It is apparent that either the xylene isomers should be separated before oxidation to form the acids or the acid isomers should be separated after oxidation. The xylene isomers occurring in the oxidation feed are difficult to separate by conventional methods due to the close similarities of their physical properties. Therefore, as an alternative, it has been suggested to separate the mixed isophthalic and terephthalic acids produced by oxidation of mixed xylenes containing meta- and para-xylenes. However, the mere suggestion of making such a separation has not been an answer in itself to the separation problem. Conventional methods of separation by fractional distillation and solvent extraction have not been satisfactory. Fractional distillation is impractical because of the tendency of terephthalic acid to sublime and because of the high boiling point of isophthalic acid which increases the danger of thermal decomposition resulting in loss or contamination of the product. Solvent extractions have not been commercially attractive because of difficulties in finding a suitable solvent which will preferentially dissolve one isomer with acceptable capacity and because of difficulties in discovering extraction conditions which enhance solubility of one isomer to achieve satisfactory capacities. Further, because of the relative insolubility of the meta- and para-phthalic acids, workable solvent extraction processes usually must be carried out at high temperatures. As another separation scheme, it has been proposed to convert the mixture of acid isomers to alkali metal salts and rely on differences in solubility of the salts in aqueous salt solutions for separation. Such a procedure involves converting the acid isomers to salts by reacting with an alkali metal hydroxide such as sodium hydroxide and, after physical separation of the salts, dissociating the salt with hydrochloric acid to free the separated isomer. However, this procedure necessitates the handling of large volumes of corrosive sodium hydroxide and hydrochloric acid with increased costs in equipment for such handling, as well as increased necessity for more extensive safety precautions for protection of plant personnel. Further, the procedure expends about two moles each of the hydroxide and hydrochloric acid, an incurrence of cost which further detracts from commercial attactiveness.

Broadly, we have now discovered that mixtures of isomers of a normally solid phthalic acid may be separated by treating the mixtures of acids with a lithium halide and an oxygen-containing organic solvent. Advantageously, such mixtures which may be separated contain a phthalic acid in which the carbonyl groups are separated by at least three ring carbon atoms. Two isomers of such configuration may be separated from each other or from another isomer. Particularly, we have discovered that mixtures containing isophthalic and terephthalic acids can be separated by contacting with lithium bromide and an oxygen-containing organic solvent and separating resulting complexes as liquid and solid phases. The present separation process is advantageous in that it is capable of giving relatively good yields of high purity acid isomers. Another advantage of the process is that it may be carried out at low temperatures, for example, below about 100° C. A further advantage of the present separation process is that it eliminates the necessity and expense of handling and expending large amounts of highly corrosive fluids.

In accordance with our invention, a mixture containing terephthalic and isophthalic acids is treated with a solution of at least about one weight percent and preferably 10 to 30 weight percent of a lithium halide, such as, for example lithium bromide, in a suitable solvent, e.g., an oxygen-containing organic solvent, advantageously at a temperature in the range of from about —20° C. to about 100° C. and preferably from about 0° C. to about 40° C. The contacted mixture may be agitated slightly to mix the acid isomers and lithium halide solution and may be then allowed to stand for a short period of time to precipitate a solid phase having an increased terephthalic content leaving a separate liquid phase having increased isophthalic acid content. The two phases are separated from each other by known separation methods such as by filtration, decanting, or the like. The terephthalic acid product may be washed with a solvent such as, for example, water to remove lithium halide. The terephthalic acid may be treated again with a lithium halide solution for further purification. The lithium halide solution components may be removed from the liquid phase leaving a solid isopthalic acid product having an increased isophthalic acid content. The isophthalic acid product may also be further separated by treating again with a lithium halide solution.

Although any lithium halide may be used in this invention, e.g. lithium bromide, lithium chloride, lithium iodide and lithium fluoride, the particularly preferred lithium halide is lithium bromide. Hereinafter, the lithium halide will be referred to as lithium bromide; but it is to be understood that any such lithium halide is intended where lithium bromide is mentioned.

The removal of the lithium bromide solution components from the liquid phase may be by evaporation or distillation to remove oxygen-containing organic solvent followed by extraction of the resulting residue from the distillation with an aqueous or other solvent for lithium bromide and filtration to recover the solid isophthalic acid product. Alternatively, the removal of lithium bromide and oxygen-containing organic solvent may be effected by adding an aqueous solvent, such as water, or other solvent for lithium bromide to remove lithium bromide from the liquid phase and distilling to remove the oxygen-containing organic solvent; the distilled liquid phase is then filtered to remove a solid isophthalic acid product of increased isophthalic acid content. The lithium bromide solution removal procedure may be used as often as desired; however, we have found that only one removal operation is necessary if sufficient solvent for the lithium bromide is used. In all cases above, the aqueous solvent or other solvent for lithium bromide may be any solvent boiling below about 250° to 300° C. in which lithium bromide is substantially soluble and in which the particular phthalic acid isomer to be washed is substantially insoluble. Lithium bromide may be recovered from the aqueous solvent or other solvent in reuseable form by evaporating the aqueous or other solvent.

Examples of suitable oxygen-containing solvents are those containing only carbon, hydrogen and oxygen, such as the low molecular weight ketones, alcohols, ethers, and esters normally used as solvents and preferably those containing from about 2 to about 12 carbon atoms. The solvent must be capable of dissolving or solubilizing at least about 2 weight percent of lithium bromide based on the solvent to form a solution of lithium bromide in oxygen-containing organic solvent. A simple experiment which may be used for determining a suitable solvent is as follows: add at least 1 gram of dried lithium bromide to 15 ml. of solvent; agitate the mixture; let the mixture stand for about thirty minutes; filter and collect and dry the lithium bromide from the precipitate. If the difference in weight between the collected lithium bromide and the original lithium bromide is greater than about 0.24 gram, at least that amount of lithium bromide has been solubilized by the 15 ml. of solvent and the solvent is suitable. Specific examples of oxygen-containing organic solvents which may be used are ethanol, isopropanol, n-butanol, isobutanol, hexanol, dodecanol, etc., glycols, hexanediol, hexanetriol, etc., phenol and alkyl phenols such as nonylphenol, etc., acetone, methyl ethyl ketone, pentanone, decanone, etc., tetrahydrofuran and the like, dimethyl ether, diethyl ether, ethylene glycol monoethyl ether, ethylene glycol dimethyl ether, diethylene glycol dimethyl ether, diethylene glycol diethyl ether, etc., ethyl acetate, ethylene glycol monoethyl ether acetate, etc., and the like. Particularly preferred are acetone, methyl ethyl ketone, and ethyl ether.

The lithium bromide solution in oxygen-containing organic solvent contains at least about one weight percent of lithium bromide. The solubility of lithium bromide sets the higher limit on the concentration of lithium bromide dissolved in solvent; however, it is preferred to use at least about 10 weight percent lithium bromide and no more than about 30 weight percent lithium bromide based on solvent. For maximum efficiency in utilizing lithium bromide, the solvent should be present in the extraction mixture in amounts exceeding about 60 weight percent based on soluble acid so that sufficient solvent is present to accommodate the soluble acid. Increasing the amount of solvent used in the extraction, with respect to a constant given amount of lithium bromide and a constant given feed material containing the acid isomers, generally results in increased yield in the extract (soluble acids) and decreased yield in the raffinate (insoluble acids) with no substantial effect on selectivity in either phase. Increasing total lithium bromide content in a constant amount of solvent in separating a given feed material generally results in increased extract yield and decreased selectivity for isophthalic acid (soluble acid) in the extract. Conversely, increased total lithium bromide content generally decreases yield of raffinate and increases purity of terephthalic acid in the raffinate. Further, an increased amount of lithium bromide solution at a given concentration on a given feed generally increases total yield of soluble isophthalic acid in the extract while selectivity remains about the same, and also tends to decrease yield of raffinate while increasing purity of the insoluble terephthalic acid in the raffinate. The above generalities regarding the separation process are based on our studies of the separation phenomena. The total amount of lithium bromide solution which should be used for preferred and optimum results with regard to a given feed material will be at least about 4 moles of lithium bromide per mole of isophthalic acid and will be discussed further below in connection with our proposed theory of the separation phenomena which results from our process.

The lithium bromide used in preparing the above solution is non-aqueous. Lithium bromide is hygroscopic, and although the wet lithium bromide is operable in this invention, it is preferred to use a dried lithium bromide since the dried salt apparently enhances the separation.

As a typical example of the process of this invention, the effluent slurry from an oxidation of petroleum-derived mixed xylenes (containing about one part by volume each of ortho-xylene, para-xylene, and ethyl benzene and two parts by volume of metaxylene) is washed with acetic acid to remove benzoic acid and orthophthalic acid and is then charged to a separator equipped with an agitator and filtered effluent line. The solids are deposited in the separator and the slurry liquid is removed by the filter line. A 4 weight percent solution of lithium bromide in methyl ethyl ketone is added in sufficient amounts to provide at least about 4 moles of lithium bromide per mole of isophthalic acid. The agitator is started momentarily to mix the solids and lithium bromide solution. The mixture is allowed to stand for 30 minutes and the liquid phase is removed by the filter line and recovered. The liquid phase is distilled at about 135° F. to remove the solvent for reuse, and the resulting residue is then washed with two gallons of water per pound of residue to remove lithium bromide in the wash fluid. The wash fluid is removed by filtration and the filtered product contains a substantially increased percentage of isophthalic acid in comparison with the original feed material. The solid phase is recovered from the separator and washed with one gallon of water per pound of solid phase to remove any entrained lithium bromide. The washed solid phase is recovered from the water wash by filtration as a product having substantially increased terephthalic acid content.

The following examples are for the purpose of illustrating the process of this invention:

EXAMPLE I

As an example of separation by this invention, a solution of 1.0 g. of dried lithium bromide in 15 ml. of acetone was added to a 50 ml. stoppered flask containing 0.5 g. of a 50–50 mixture of isophthalic acid and terephthalic acid at room temperature (25° C.). The resulting extraction mixture was agitated and then allowed to stand for 30 minutes. Undissolved acid was recovered by filtration as a solid raffinate and weighed 0.25 g.

Ultraviolet analyses of the solid raffinate were as follows: [1]

| | Mol percent |
|---|---|
| Isophthalic acid | 1.3 |
| Terephthalic acid | 98.1 |
| Orthophthalic acid [2] | 0.6 |

[1] All results reported in this example and in other examples hereinafter have been normalized to 100% total phthalic acid isomers.
[2] In this example and in all following examples, orthophthalic acid is reported in the analyses of separated components. The presence of orthophthalic acid in the analysis is apparently due to impurities in the feed and/or inaccuracies arising from difficulties in distinguishing between the phthalic acid isomers in the analysis.

In order to determine the action of the solvent alone, the above example was repeated omitting the lithium bromide. The undissolved acid weighed 0.5 g. There was very little, if any, solubility in the acetone.

EXAMPLE II

As an example demonstrating recovery of the dissolved acid in the filtrate a solution of 1.0 g. of dried lithium bromide in 30 ml. of acetone was added to a 50 ml. stoppered flask containing 2.0 g. of a 50–50 mixture of isophthalic acid and terephthalic acid at room temperature (25° C.). The resulting extraction mixture was agitated and then allowed to stand for thirty minutes. Undissolved acid was recovered by filtration as a solid raffinate and weighed 1.5 g. The extract (filtrate) was evaporated to dryness leaving a solid residue. The solid residue was washed with 10 ml. of water and filtered to recover the solid residue. The recovered solid residue weighed 0.75 g. Ultraviolet analyses of the solid raffinate and the washed solid residue from the extract (filtrate) were as follows:

|                          | Iso-phthalic acid, mol percent | Tereph-thalic acid, mol percent | Ortho-phthalic acid, mol percent |
|--------------------------|--------------------------------|---------------------------------|----------------------------------|
| Solid raffinate          | 17.9                           | 82.0                            | 0.1                              |
| Solid residue from extract | 92.8                         | 7.2                             |                                  |

EXAMPLE III

As an example illustrating recovery of product from the wash water, a solution of 1.2 g. of dried lithium bromide in 15 ml. of acetone was added to a 50 ml. stoppered flask containing 2 g. of a 50-50 mixture of isophthalic acid and terephthalic acid at room temperature (25° C.). The resulting extraction mixture was agitated and then allowed to stand for 30 minutes. Undissolved acid was recovered by filtration as a solid raffinate and weighed 1.35 g. The extract (filtrate) was evaporated to dryness leaving a solid residue. The solid residue was washed with 50 ml. of water and filtered to recover the solid residue. The recovered solid residue weighed 0.58 g. The wash water used above was saved and evaporated to dryness leaving a wash water residue weighing 0.05. Ultraviolet analyses of the solid raffinate, the washed solid residue from the extract (filtrate) and the wash water residue were as follows:

|                          | Iso-phthalic acid, mol percent | Tereph-thalic acid, mol percent | Ortho-phthalic acid, mol percent |
|--------------------------|--------------------------------|---------------------------------|----------------------------------|
| Solid raffinate          | 24.3                           | 74.5                            | 1.2                              |
| Solid residue from extract | 94.9                         | 4.5                             | 0.6                              |
| Wash water residue       | 82.3                           | 15.2                            | 1.5                              |

EXAMPLE IV

As an example employing purification of the solid residue from the extract, a solution of 2 g. of dried lithium bromide in 15 ml. of acetone was added to a 50 ml. stoppered flask containing 2 g. of a 50-50 mixture of isophthalic acid and terephthalic acid at room temperature (25° C.). The resulting extraction mixture was agitated and then allowed to stand for 30 minutes. Undissolved acid was recovered by filtration as a solid raffinate and weighed 1.07 g. The extract (filtrate) was added to 50 ml. of water, heated to evaporate the acetone and filtered leaving a solid residue.

The recovered solid residue weighed .87 g. Ultraviolet analyses of the solid raffinate and the solid residue for isophthalic, terephthalic and orthophthalic acids were as follows:

|                  | Iso-phthalic acid, mol percent | Tereph-thalic acid, mol percent | Ortho-phthalic acid, mol percent |
|------------------|--------------------------------|---------------------------------|----------------------------------|
| Solid raffinate  | 4.5                            | 95.5                            |                                  |
| Solid residue    | 92.1                           | 7.5                             | 0.4                              |

The solid residue was repurified with water as follows: 0.5 g. of the solid residue were added to 200 ml. of water and the resulting mixture was heated to boiling and then allowed to stand. 0.417 g. of precipitate was recovered by filtering. The repurified product had the following ultraviolet analysis:

|                    | Mol percent |
|--------------------|-------------|
| Isophthalic acid   | 94.5        |
| Terephthalic acid  | 4.8         |
| Orthophthalic acid | 0.7         |

EXAMPLES V TO IX

In order to determine the effect on the extraction of the lithium bromide concentration, a series of examples were run as follows: For each example, a solution of the amount of dried lithium bromide in 15 ml. (12 grams) of acetone was added to a 50 ml. stoppered flask containing 2 g. of a 50-50 mixture of isophthalic acid and terephthalic acid. The resulting extraction mixture was agitated and then allowed to stand for about thirty minutes. Undissolved acid was recovered by filtration as a solid raffinate and the weight of solid raffinate from each example is recorded in Table I. The extract (filtrate) was evaporated to dryness leaving a solid residue. The solid residue was washed with about ten ml. of water and filtered to recover the solid residue. The weight of each recovered solid residue is reported in Table I. Ultraviolet analyses of the feed, the solid raffinate and the washed solid residue from the extract (filtrate) for isophthalic, terephthalic and orthophthalic acids for each extraction are reported in Table I. Examples III and IV above are also included in Table I.

Table I

| Example | Lithium bromide | | Solid raffinate, U.V. anal., mol percent | | | | Solid residue from extract, U.V. anal., mol percent | | | |
|---------|--------|--------------------------|--------|------|------|------|--------|------|------|------|
|         | Grams  | Wt. percent in acetone  | Wt., g.| I.A.[1] | T.A.[2] | O.A.[3] | Wt., g.| I.A. | T.A. | O.A. |
| V       | 0.24   | 2.0                      | 1.88   | 42.6 | 57.4 |      | 0.06   | 95.8 | 2.5  | 1.7  |
| VI      | 0.48   | 4.0                      | 1.80   | 39.2 | 59.8 | 1.0  | 0.13   | 95.9 | 3.6  | 0.5  |
| VII     | 0.22   | 6.0                      | 1.67   | 33.7 | 63.3 |      | 0.30   | 93.6 | 5.3  | 1.1  |
| VIII    | 0.84   | 7.0                      | 1.67   | 39.0 | 61.0 |      | 0.31   | 92.9 | 6.5  | 0.6  |
| III     | 1.20   | 10.0                     | 1.35   | 24.3 | 74.5 | 1.2  | 0.58   | 94.9 | 4.5  | 0.6  |
| IV      | 2.0    | 16.7                     | 1.07   | 4.5  | 95.5 |      | 0.87   | 92.1 | 7.5  | 0.4  |
| IX      | 3.0    | 25.0                     | 1.15   | 8.4  | 91.5 | 0.1  | 0.80   | 91.3 | 8.3  | 0.4  |

[1] Isophthalic acid.  [2] Terephthalic acid.  [3] Orthophthalic acid.

From the data of Table I, it is apparent that as the amount of lithium bromide in a given amount of solvent was increased, the yield of residue from the extract was proportionately increased and the yield of solid raffinate was decreased. The increase in soluble acid in the extract was found to hold true until lithium bromide concentration was raised to about 25 weight percent where the rate of increase fell off and in one instance actually showed a decrease in soluble acids at 25 weight percent lithium bromide. Further, with increased lithium bromide, the purity of isophthalic acid in the residue from the extract is slightly decreased and the purity of the terephthalic acid in the solid raffinate is substantially increased.

EXAMPLES X TO XII

Separations in accordance herewith were made using varying amounts of acetone solvent in the lithium bromide solution as indicated in Table II. In each separation, 2.0 g. of a 50-50 mixture of the isophthalic and terephthalic acid were mixed with 1.0 gram of lithium bromide and the amount of solvent indicated. The mixtures were allowed to stand for about 30 minutes at room temperature and then filtered. The filtrate of each was evaporated to remove the acetone and then was washed with 10 ml. of water and filtered to remove lithium bromide in the wash water. The remaining solid residue from the extract (filtrate) was analyzed (ultraviolet) with the results reported in Table II.

*Table II*

SOLID RESIDUE FROM EXTRACT

| Example | Acetone, ml. | Wt., g. | I.A., mol percent | T.A., mol percent | O.A., mol percent |
|---|---|---|---|---|---|
| X | 15 | 0.50 | 93.9 | 5.9 | 0.2 |
| XI | 30 | 0.55 | 93.6 | 5.8 | 0.6 |
| XII | 45 | 0.60 | 93.5 | 6.1 | 0.4 |

The data of Table II, above, indicates that although increasing the amount of solvent used may slightly increase the total yield of dissolved acid, no appreciable change in selectivity occurred. It is concluded that it is necessary to use only that amount of solvent which will solubilize the lithium bromide.

EXAMPLES XIII TO XXI

In accordance with this invention, separations by the procedure of Example III were carried out varying the ratio of isophthalic or terephthalic acids in the mixture of acids used as a feed. The amounts of components used in the procedure and the results of the separations are reported in Table III.

The data of Table III demonstrate that mixtures of acids having various ratios of isophthalic to terephthalic acid may be separated by this invention. With regard to the above data, a comparison of Examples XV and XVII to XX indicates that increased yield is obtained with increased weight percent of lithium bromide in the solvent, although selectivity for the isophthalic isomer decreases slightly with increased yield. Further, in comparing Examples XVIII and XXI, increased total amount of lithium bromide and solvent gave better selectivity.

Further experiments on the separation were carried out by repeating the procedure of Example III at 0° and 40° C. The results from these experiments indicated an extract (dissolved acid) yield advantage at higher temperatures and a slight increase in selectivity in the extract at lower temperatures. Conversely, at lower temperatures, the yield of raffinate insoluble acid increased and at higher temperatures, increased purity of terephthalic acid in the raffinate was obtained.

EXAMPLES XXII AND XXIII

To determine the effect of the dryness of lithium bromide, the procedure of Example II was repeated using 2.0 grams of lithium bromide in 30 ml. of acetone with 2.0 grams of the 50-50 mixture of acids. In one run (Example XXIII) the lithium bromide was not dried prior to mixing with acetone. The results are reported in Table IV.

*Table IV*

| Example | Lithium bromide | Solid raffinate, U.V. anal., mol percent | | | | Solid residue from extract, U.V. anal., mol percent | | | |
|---|---|---|---|---|---|---|---|---|---|
| | | Wt., g. | I.A. | T.A. | O.A. | Wt., g. | I.A. | T.A. | O.A. |
| XXII | Dried | 1.15 | 3.3 | 96.7 | ------ | 1.1 | 89.9 | 8.9 | 1.2 |
| XXIII | Not dried | 1.2 | 17.1 | 82.7 | 0.2 | 0.8 | 92.1 | 7.1 | 0.8 |

Referring to the data of Table IV, the dried lithium bromide increased the total extract obtained and more completely removed isophthalic acid from the raffinate leaving a higher purity terephthalic acid in the raffinate.

In order to demonstrate the procedure for determining a suitable oxygen-containing organic solvent, the solubility of 1 gram of lithium bromide in 15 ml. of each of various proposed solvents was determined. The lithium bromide was dried in a vacuum oven at 160° C. for 24 hours. The 1 gram of anhydrous lithium bromide was added to the 15 ml. of each solvent and the solvent was then warmed to boiling and agitated for 3 hours while

*Table III*

| Example | Lithium bromide | | Acetone, Ml. (grams) | Feed | | Solid raffinate | | | | Solid residue from extract | | | |
|---|---|---|---|---|---|---|---|---|---|---|---|---|---|
| | Wt., g. | Wt. percent in acetone | | Wt., g. | IA:TA | Wt., g. | I.A. | T.A. | O.A. | Wt., g. | I.A. | T.A. | O.A. |
| XIII | 2.0 | 16.7 | 15(12) | 1.5 | 2:1 | 0.4840 | --- | --- | --- | 0.6018 | 97.1 | 2.9 | --- |
| XIV | 2.0 | 16.7 | 15(12) | 2.5 | 4:1 | 1.5603 | --- | --- | --- | 0.7342 | 92.5 | 6.3 | 1.2 |
| XV | 2.0 | 16.7 | 15(12) | 3.5 | 6:1 | 2.4610 | --- | --- | --- | 0.6673 | 95.5 | 3.9 | 0.6 |
| XVI | 2.0 | 8.3 | 30(24) | 3.0 | 9:1 | 1.9359 | 0 | --- | --- | 0.8421 | 92.9 | 6.4 | 0.7 |
| XVII | 0.5 | 4.15 | 15(12) | 3.5 | 6:1 | 3.2088 | 80.3 | 19.5 | 0.2 | 0.2222 | 92.0 | 7.0 | 1.0 |
| XVIII | 1.0 | 8.3 | 15(12) | 3.5 | 6:1 | 2.9376 | 80.0 | 20.0 | --- | 0.4545 | 92.0 | 7.6 | 0.4 |
| XIX | 1.5 | 12.5 | 15(12) | 3.5 | 6:1 | 2.70 | 78.9 | 20.6 | 0.5 | 0.62 | 92.3 | 7.7 | 0.0 |
| XX | 3.0 | 25.0 | 15(12) | 3.5 | 6:1 | 2.06 | 75.9 | 23.9 | 0.2 | 1.14 | 91.6 | 7.7 | 0.7 |
| XXI | 2.0 | 8.3 | 30(24) | 3.5 | 6:1 | 2.5194 | --- | --- | --- | [1] 0.4273 | 95.7 | 2.2 | 2.1 |

[1] An additional 0.4515 gram containing 86.5 weight percent I.A., 12.2 weight percent T.A., and 1.3 weight percent O.A. was recovered from the wash water used to wash the extract residue by evaporating the wash water to about 20 ml., cooling and filtering.

cooling to 25° C. Any undissolved lithium bromide was noted. The results were as follows:

| Solvent | Solubility |
|---|---|
| Ethanol | Soluble. |
| Isopropanol | Mostly soluble, small amount insoluble. |
| n-Butanol | Soluble. |
| Methyl ethyl ketone | Mostly soluble, trace insoluble. |
| Ethylene glycol monoethyl ether acetate | Soluble. |
| Ethyl acetate | Mostly soluble, very small amount insoluble. |
| Ethylene glycol monoethyl ether | Soluble. |
| 3-pentanone | Soluble.[5] |

[5] Soluble hot, but on cooling a small amount came out of solution.

The above solvents all exhibited sufficient solubility so that they may be used in this invention. Other solvents may readily be determined by those skilled in the art by simple experimentation.

The lithium bromide may also be used to increase the efficiency of solvents which selectively or preferentially dissolve isophthalic acid and reject the terephthalic isomer as a solid. For example, in employing tertiary amines or pyridines such as 4-methyl pyridine for the selective separation of mixtures of the acid isomers, lithium bromide may be added to the extraction mixture as an auxiliary separating agent in amounts of at least about 2 weight percent and preferably about 10 weight percent based on the solvent. The lithium bromide, however, must be sufficiently soluble in the solvent with which it is used to provide an amount of lithium bromide in the extraction system sufficient for effective enhancement of selectivity of the solvent.

Although we do not intend to be held by any theories regarding the separation phenomena of lithium bromide in separating isophthalic and terephthalic acids, we believe that the lithium bromide forms a complex with the isophthalic acid, which complex is soluble in the same oxygenated organic solvent which solubilizes the lithium bromide. We have varied the amount of lithium bromide per mol of isophthalic (soluble) acid in some of the above examples in illustration of this invention and from the amount of isophthalic acid solubilized we have calculated the mol ratio of lithium bromide to soluble acid in the soluble complex as follows:

| Example | Wt. percent LiBr in acetone | Mol ratio, LiBr/soluble acid |
|---|---|---|
| XVII [1] | 4.15 | 4.25 |
| XVIII [1] | 8.3 | 3.8 |
| XIX [1] | 12.5 | 4.45 |
| XV [1] | 16.7 | 4.3 |
| XX [1] | 25.0 | 5.2 |

[1] Prepared from a 6:1 IA:TA feed.

It is believed that about 4.3 moles of lithium bromide complex with one mole of soluble acid. We have experimented with lithium bromide-soluble acid complexes from other of the above separations and found them to generally contain about 4.3 moles of lithium bromide per mole of soluble acid, deviating down to 3.6 and up as high as 7.65 in one instance on the complexes examined. In one set of examples where the feed ratio was varied, the mole ratio of lithium bromide to soluble acid in the complex remained relatively constant, as follows:

| Example | IA:TA ratio | Wt. percent LiBr in acetone | Mol ratio, LiBr/soluble acid |
|---|---|---|---|
| XIII | 2:1 | 16.7 | 4.2 |
| XIV | 4:1 | 16.7 | 4.4 |
| XV | 6:1 | 16.7 | 4.3 |
| XVIa | 9:1 | 16.7 | 4.4 |

All percentages herein indicated are percentages by weight unless otherwise stated.

It is evident from the foregoing that we have provided a method for separating isomers of phthalic acid, and particularly isophthalic and terephthalic acids, using lithium bromide as a complexing agent and a solvent for a complexed isomer.

We claim:

1. A method of separating isophthalic acid from a normally solid acid mixture of isophthalic acid with terephthalic acid, which method comprises treating said mixture at a temperature in the range of from about −20° C. to about 100° C. with a solution of from about 1 to about 30 weight percent lithium bromide in an organic solvent containing only carbon, hydrogen and oxygen to produce an isophthalic acid complex, said solvent being selected from the group consisting of alcohols, ethers and ketones in an amount sufficient to provide at least about 4 moles of lithium bromide per mole of isophthalic acid and separately recovering a solid raffinate phase containing an increased proportionate amount of terephthalic acid and a liquid extract phase containing an increased proportionate amount of isophthalic acid complex.

2. A method for separating isophthalic acid from a normally solid acid mixture containing isophthalic acid and terephthalic acid, which method comprises treating said mixture at a temperature in the range of from about −20° C. to about 100° C. with a solution of from about one to about 30 weight percent of lithium bromide in an organic solvent containing only carbon, hydrogen and oxygen to produce an isophthalic acid complex, said solvent being selected from the group consisting of alcohols, ethers and ketones in an amount sufficient to provide at least about 4 moles of lithium bromide per mole of isophthalic acid in said mixture, separating the resultant liquid extract phase containing an increased proportionate amount of isophthalic acid complex from the resultant solid raffinate phase containing an increased proportionate amount of terephthalic acid, distilling said liquid extract phase, and extracting the resulting residue with water.

3. The method of claim 2 wherein the lithium bromide is anhydrous lithium bromide, the organic solvent is used in an amount of at least about 60 weight percent based on soluble acid in said mixture, the amount of lithium bromide is in the range of from about 10 to about 30 weight percent based on the organic solvent, and the treating temperature is in the range of from about 0° C. to about 40° C.

References Cited in the file of this patent

UNITED STATES PATENTS

| 2,833,816 | Saffer et al. | May 6, 1958 |
| 2,840,604 | Feighner et al. | June 24, 1958 |
| 2,857,429 | Brunson et al. | Oct. 21, 1958 |